United States Patent [19]

Gandy et al.

[11] 4,332,619

[45] Jun. 1, 1982

[54] EXPANSIVE ADMIXTURE

[75] Inventors: Richard G. Gandy, Grand Prairie, Tex.; Garry L. Briggs, Edmonton, Canada

[73] Assignee: BJ-Hughes Inc., Houston, Tex.

[21] Appl. No.: 206,507

[22] Filed: Nov. 13, 1980

[51] Int. Cl.$^3$ .............................................. C04B 7/353
[52] U.S. Cl. ...................................... 106/87; 106/93; 106/98; 106/314
[58] Field of Search ...................... 106/87, 93, 98, 314

[56] References Cited

U.S. PATENT DOCUMENTS

| 1,782,384 | 11/1930 | Greider | 106/87 |
|---|---|---|---|
| 3,131,075 | 4/1964 | Brooks | 106/98 |
| 3,359,225 | 12/1967 | Weisend | 106/93 |
| 3,890,157 | 6/1975 | Babcock | 106/98 |
| 4,258,790 | 3/1981 | Hale | 106/93 |

*Primary Examiner*—James Poer
*Attorney, Agent, or Firm*—Robert A. Felsman; Charles D. Gunter, Jr.

[57] ABSTRACT

An expansive admixture is shown of the type used in cementing oil and gas well bores. Aluminum particles are coated with a gasoline and water insoluble wood resin. The resin coated aluminum particles in combination with activated charcoal and a fluid loss additive provide controlled expansion of the slurry over an extended period of time without detracting from other desirable properties of the slurry.

5 Claims, No Drawings

EXPANSIVE ADMIXTURE

CROSS REFERENCE TO RELATED APPLICATION

This application is related to the co-pending application of Garry L. Briggs entitled "Resin Coated Aluminum" filed concurrently herewith.

BACKGROUND OF THE INVENTION

This invention relates to an improved expansive admixture for cement compositions and a method for cementing the annular space between the casing or pipe and surrounding formation in oil and gas wells.

In well bore cementing, the cement slurry is pumped down a pipe and up the annular space between the pipe and the surrounding earth formation. The slurry is allowed to set-up or harden in the annular space, thereby forming a rigid column which ideally forms a bond with the earth formation as well as with the metal pipe. Shrinkage in the cement column can result in small passageways, sometimes called microannuli, being formed across the diameter of the column. When this happens, formation fluids can migrate across the column and contaminate the producing zone. Inhibiting shrinkage in the cement column during setting serves to prevent the formation of microannuli and assures a good bond between the cement, pipe and formation.

Various methods have been suggested for inhibiting shrinkage of the cement column including the addition to the cement composition of gas delivering agents including powdered aluminum. See, for example, U.S. Pat. No. 2,120,468 to Noak Victor Hybinette entitled "Expanded Concrete and Process of Producing the Same", issued June 14, 1938.

In the co-pending application of Garry L. Briggs entitled "Resin Coated Aluminum" filed concurrently herewith, an aluminum expansive additive is disclosed which inhibits shrinkage in cement columns during well cementing operations. The novel expansive additive comprises aluminum particles which have been coated with a gasoline and water insoluble wood resin sold commercially as "VINSOL". The resin coated aluminum particles provide improved control over the nature of gas generation in the cement slurry and its duration and enable control of shrinkage in a cement column during its entire setting and hardening. The resin coating on the aluminum particles decreases the explosion hazard associated with handling aluminum particles while allowing the particles to be dry blended with a cement composition and stored in the shelf.

It has now been discovered that the novel resin coated aluminum particles in combination with activated charcoal and a fluid loss additive provide a greatly improved expansive admixture for cementing well bores.

SUMMARY OF THE INVENTION

Accordingly, the expansive admixture of the present invention comprises coated aluminum particles, activated charcoal, and a fluid loss additive. The aluminum particles are coated with a gasoline and water insoluble wood resin which comprises about 10 percent by weight of the dried coated particles. A method of cementing the annular space between the pipe and surrounding formation in oil and gas wells is also disclosed. A pumpable slurry is first prepared including cement, water, and an effective amount of the expansive admixture comprising approximately 12 weight percent coated aluminum particles, approximately 47 weight percent activated charcoal, and approximately 41 weight percent fluid loss additive. All weight percentages are based upon the weight of dry expansive admixture. The slurry is then pumped into the annular space in the well and allowed to set. The expansive admixture is present in an amount ranging from 0.7 to 3.3 weight percent based on the dry weight of cement.

DETAILED DESCRIPTION OF THE INVENTION

The term "cement composition", as used herein, is intended to include those inorganic cements which harden or set under water and may be admixed with extenders and fine aggregate or the like, and includes settable hydraulic cements. Cement compositions of this type are prepared in the form of a fluid pumpable slurry which is introduced into the well bore through the casing or pipe.

The present expansive admixture includes coated aluminum particles, activated charcoal, and a fluid loss additive. The nature of the hydraulic cement as well as the conditions of use determine the amount of admixture which is to be used. Accordingly, the quantity of the admixture should be determined for each batch of cement and intended use. This determination is made utilizing standard testing procedures such as those, for example, specified by the American Petroleum Institute (API) under various API RP titles. The admixture of the present invention is provided in an effective amount to give a cement composition which initially expands in 1–4 hours and continues to expand for upwards of 20 days at a controlled rate, which has a compressive strength after 24 hours of 1000–5000 pounds per square inch (psi), which has a fluid loss of under 200 milliliters (ml) in 30 minutes, and which has a free water content of under one percent by volume.

Any source of finely divided, oxide free aluminum particles may be used in the practice of the present invention. The particle size can vary between about 100 and 325 mesh with the preferred particle size being 200 mesh. The explosive hazards posed by aluminum powders are greatly reduced as particle size is increased. For this reason, use of particles smaller than 100 mesh is not recommended. Conversely, as the particle size increases, the reactive surface area of the aluminum decreases with a resulting decrease in expansive capability of the admixture. The preferred aluminum particles are produced by The Alcan Corporation and sold under the brand name Alcan MD-201. The MD-201 particles are greater than 99 percent pure aluminum with an apparent density of 0.65 grams/cc, an approximate bulk density of 40 lbs./cu. ft., and are approximately 200 mesh size.

The aluminum particles of the present invention are preferably coated with a gasoline and water insoluble wood resin, commercially sold by Hercules, Inc., under the trade name "VINSOL", referred to herein as the "resin". The resin may be produced by extracting resinous pine wood with a coal tar hydrocarbon, removing the hydrocarbon by evaporation, leaving a residue comprising a mixture of wood rosin and the gasoline insoluble resin. The resin is then separated from the wood rosin by extracting the latter by a suitable petroleum hydrocarbon in which the wood rosin is soluble.

The aluminum particles are coated as follows: Approximately 20 grams of the resin and 200 ml of methanol are placed in a Waring blender and mixed at low speed for 2 to 4 minutes. Approximately 100 grams of MD-201 aluminum particles are placed into a container. The resin-methanol solution is poured over the aluminum particles taking care that all of the particles contact the resin-methanol solution. The excess solution is poured off and the remaining particles are stirred while a mild heat source is applied and allowed to dry. The coated particles are then passed through a 100 mesh wire screen. The coated particles are approximately 10 percent by weight resin and 90 percent by weight aluminum.

The coated aluminum component is utilized in the expansive admixture in amounts ranging from about 3 to 40 weight percent, based on the dry weight of the expansive admixture, and preferably about 5 to 15 weight percent, with the preferred amount being approximately 12 weight percent.

The activated charcoal component of the present expansive admixture can be any of the porous particulate materials of the so called industrial absorbent type which are sold commercially. The preferred charcoal component is "NuCHAR-S-A" sold by the Westvaco Corporation. The preferred particle size is 200 to 325 mesh. The activated charcoal component is generally utilized in the expansive admixture in amounts ranging from about 17 to 80 weight percent, based on the dry weight of expansive admixture, and preferably about 40 to 60 weight percent, with the preferred amount being approximately 47 weight percent.

The fluid loss additive can conveniently be any of the recognized additives, including mixtures thereof, available commercially such as carboxymethyl hydroxyethyl cellulose (CMHEC), hydroxyethyl cellulose (HEC), polysaccharides, polyacrylamids, polyacrylonitrile, polymethacrylates, polyamines, and polyvinylpyrrolidinone. The preferred fluid loss additive is a blend containing approximately 20 weight percent hydroxyethyl cellulose, approximately 4 weight percent polyvinylpyrrolidinone, approximately 17 weight percent of the sodium salt of a sulphonated naphthalene formaldehyde condensate, and approximately 0.12 weight percent fumed silica. All weights are based on the dry weight of expansive admixture.

The fluid loss additive component of the expansive admixture is generally present in amounts ranging from about 10 to 70 weight percent based on the dry weight of expansive admixture and preferably about 30 to 55 weight percent, with the preferred amount being approximately 41 weight percent. A fluid loss additive is effective for the purposes of this invention when its addition in the range of about 41 percent to an expansive admixture results in decreasing the fluid loss characteristics of the resulting cement slurry to below 200 ml/30 minutes.

The expansive admixture is generally utilized in a slurry which includes at least a hydraulic cement, water, and the expansive admixture. The proportions of the various ingredients in the slurry vary depending upon its intended use and the nature of the cement, the water, and the expansive admixture. Other materials such as fillers, dispersants, retarders, and accelerators can conveniently be utilized in the slurry along with the expansive admixture of the present invention. Water is generally utilized in quantities ranging from 30 to 150 weight percent, preferably 35 to 65 weight percent based on the dry weight of cement. Up to a depth of about 14,000 feet, the expansive admixture is utilized in quantities ranging from approximately 0.7 to 3.3 weight percent, based on the dry weight of the cement and preferably from about 1.5 to 2.0 weight percent with the preferred amount being approximately 1.7 weight percent. At depths blow about 14,000 feet, the expansive admixture is preferably used in amounts in excess of about 1.7 weight percent.

In practicing the invention, a pumpable slurry is prepared which includes cement, sufficient water, and an effective amount of expansive admixture. The slurry is then pumped into the annular space between the pipe and surrounding formation in the well and allowed to set.

The following examples further illustrate the invention. In the examples, a specific expansive admixture was prepared by blending together in the dry state in a Waring blender 12 weight percent resin coated aluminum prepared as previously described, 47 weight percent NuCHAR-S-A activated charcoal, and 41 weight percent fluid loss additive comprising 20 weight percent hydroxyethyl cellulose, 4 weight percent polyvinylpyrrolidinone, 17 weight percent of the sodium salt of a sulphonated naphthalene formaldehyde condensate, and 0.12 weight percent fumed silica. All weights are based on the dry weight of expansive admixture. These ingredients were thoroughly mixed and were utilized in conducting the tests which follow.

The tests for percentage of expansion were done according to the guidelines in The American Society of Testing Materials (ASTM) publication C 227-52 T known in the cement industry and hereby incorporated by reference. The procedure was briefly as follows:

A cement specimen containing the expansive admixture approximately 10 inches by 1 inch by 1 inch was poured into a mold containing a pin at either end. The specimen was cured for 24–48 hours at 3,000 pounds per square inch (psi) pressure and a specified temperature in a water bath. The specimen was removed from the water bath and an initial measurement of the distance between the two pins was made using a gauge indicator. The specimen was then returned to the water bath at 3000 psi and the specified temperature. The distance measurements were repeated at specified intervals and used to calculate the percentage of expansion. The weight percentages listed in the examples which follow are based on the dry weight of cement.

EXAMPLE ONE

Cement: Canada Class "G"
Water: 44 weight percent
Expansive Admixture: 1.7 weight percent
Temperature: 100° F.
Curing Time: 24 hours

| Day | Original length of specimen (inches) | final length (inches) | amt. of expansion | % of expansion |
|---|---|---|---|---|
| 0 | 11.7111 | | | |
| 1 | | 11.7135 | .0024 | .020 |
| 2 | | 11.7141 | .003 | .0256 |
| 3 | | 11.7149 | .0038 | .032 |
| 22 | | 11.7161 | .005 | .0427 |

EXAMPLE TWO

Cement: Canada Class "G"

Water: 44 weight percent
Expansive Admixture: 1.7 weight percent
Temperature: 140° F.
Curing Time: 24 hours

| Day | Original length of specimen (inches) | final length (inches) | amt. of expansion | % of expansion |
|---|---|---|---|---|
| 0 | 11.7286 | | | |
| 1 | | 11.73 | .0014 | .0119 |
| 2 | | 11.7312 | .0026 | .0222 |
| 3 | | 11.7313 | .0027 | .023 |
| 4 | | 11.7318 | .0032 | .0273 |
| 23 | | 11.7328 | .0042 | .0358 |

EXAMPLE THREE

Cement: Canada Class "G"
Water: 44 weight percent
Expansion Admixture: 1.7 weight percent
Temperature: 140° F.
Curing Time: 48 hours

| Day | Original length of specimen (inches) | final length (inches) | amt. of expansion | % of expansion |
|---|---|---|---|---|
| 0 | 11.737 | | | |
| 1 | | 11.7378 | .0008 | .0068 |
| 2 | | 11.7381 | .0011 | .0094 |
| 3 | | 11.7386 | .0016 | .0136 |
| 22 | | 11.740 | .003 | .0256 |

It can be seen from the above that the expansive admixture of the present invention gives a cement composition which expands initially in 1–4 hours and continues to expand for upwards of 20 days at a controlled rate.

In Table I which follows, a cement composition containing the expansive admixture of the present invention is compared to a neat cement and a cement composition which contains only resin coated aluminum particles.

The slurries were prepared using a Waring blender as the mixer. The water was placed in the blender jar. Canada class "G" dry cement was then added, in 15 seconds or less, to the water as stirring was continued at low speed. In one case, the cement was a neat cement containing no additives. In the second slurry, resin coated aluminum particles in select percentages were dry blended with the cement composition. In the third slurry, the expansive admixture of the present invention was dry blended with the cement composition prior to adding the same to the water.

When all the dry cement had been added to the water, the stirring was increased to high speed for 35 seconds. The mixture was then placed in an atmospheric pressure consistometer and stirred for 20 minutes. The mixture was then restirred for 35 seconds at high speed on the Waring blender and 102 mls. were poured into a 250 ml. graduated cylinder. The cylinder was sealed and allowed to stand. Volume increases in the cylinder were read in half hour intervals and the results shown in Table I.

Fluid loss, compressive strength, and thickening time were all determined using the methods outlined in The American Petroleum Institute Publication API RP 10 B, "Recommended Practice For Testing Oil Well Cements And Cement Additives", December 1979, the disclosure of which is hereby incorporated by reference.

TABLE I

| | Neat Cement Canada "G" 44% water (no additives) | Canada "G" Cement 44% water + 0.2% resin coated AL | Canada "G" Cement 44% water + 0.2% resin coated AL + 0.8% activated charcoal + 0.7% fluid loss additive |
|---|---|---|---|
| Fluid Loss Schedule 5 125° F. | over 600 ml | over 600 ml | 195 ml |
| Compressive Strength Schedule 5s 200° F., 24 hr. | 4525 ml | 4300 psi | 3100 psi |
| Expansion @ 20° C. (in 250 ml graduated cylinder) | 102 ml | 102 ml | 102 ml (no free water) |
| 30 min | 0 | 111 ml free water 1½ ml | 112 ml |
| 1 hr | 0 | 129 ml free water 2 ml | 151 ml |
| 1½ hr | 0 | 130.5 ml free water 2 ml | 194 ml |
| 2 hr | 0 | 132.0 ml free water 2 ml | 209 ml |
| T.T. Schedule 5 125° F. | 90 min | 90 min | 148 min |
| Bond Strength Schedule 5s 200° F., 24 hr. | 363 psi | 641 psi | 469.1 psi |

The figures tabulated for fluid loss, compressive strength, and thickening time represent the average of three determinations.

The bond strength is a measure of the strength of the bond which exists between the cement and casing or formation and was determined as follows:

A steel rod 1 inch in outer diameter (O.D.) and 4 inches long was set in the center of a stainless steel pipe 3 inches long and 2 inches in internal diameter (I.D.) and held in place by a plastic bottom cap. The cement slurry to be tested was poured into the annular space between the rod and pipe. A top plastic cap was then placed on the 2 inch I.D. pipe and the mold placed into a pressure curing chamber. The specimens were cured according to API RP 10 B schedule 5s at 200° F. for 24 hours. The specimens were then taken out of the curing chamber and placed in a standard compressive strength testing machine. A vertical load was applied to the rod until the bond between the cement and rod was broken.

Bonding strength was calculated from the load applied divided by the contact area between the rod and cement. The figures tabulated represent the average of three determinations.

It should be apparent that an invention has been provided with significant advantages. The expansive admixture and method the present invention give a cement composition which is pumpable, has a normal thickening time and has good compressive strength when set. Compressive strength of the cement compositions should be at least 1000 psi after 24 hours. Compressive strength of the cement compositions containing the expansive admixture exceeds 1000 psi in 24 hours.

The API has set 1.4% by volume as the maximum allowable free water content for well cements. Free water can be kept under 1% by the present mixture. Fluid loss as measured by the API RP 10B specification can be kept under 200 ml.

The present cement composition expands initially in 1-4 hours and continues to expand for upwards of 20 days at a controlled rate. The controlled rate of expansion inhibits shrinkage and gives a tight bond between the pipe, cement, and surrounding formation. A tight bond inhibits formation of microannuli in the cement column and eliminates migration of fluids between the zones.

While it is apparent the invention has been shown in only one of its forms, it should be apparent to those skilled in the art that it is not so limited but is susceptible to various changes and modifications without departing from the spirit thereof.

I claim:

1. An expansive admixture for cement compositions of the type used to cement the annular space between the pipe and surrounding formation in oil and gas wells, comprising:

coated aluminum particles in a range from about 3 to 40 weight percent based on the dry weight of the expansive admixture, wherein said coated aluminum particles are coated with a gasoline and water insoluble wood resin;

activated charcoal in a range from about 17 to 80 weight percent based on the dry weight of the expansive admixture; and a fluid loss additive in a range from about 10 to 70 weight percent based on the dry weight of the expansive admixture.

2. The expansive admixture of claim 1, wherein said fluid loss additive comprises:

approximately 20 weight percent hydroxyethyl cellulose;

approximately 4 weight percent polyvinylpyrrolidinone;

approximately 17 weight percent of the sodium salt of a sulphonated naphthalene formaldehyde condensate; and approximately 0.12 weight percent fumed silica.

3. The expansive admixture of claim 1, including:

approximately 12 weight percent coated aluminum particles;

approximately 47 weight percent activated charcoal;

approximately 41 percent fluid loss additive.

4. A cement composition of the type used to cement the annular space between the pipe and surrounding formation in oil and gas wells comprising cement, sufficient water to effect hydraulic setting of the cement, and an effective amount of an expansive admixture comprising coated aluminum particles wherein said coated aluminum particles are coated with a gasoline and water insoluble wood resin, activated charcoal, and a fluid loss additive.

5. The cement composition of claim 4, including from about 0.7 to 3.3 weight percent of said expansive admixture.

* * * * *